(12) United States Patent
Kinnan et al.

(10) Patent No.: US 7,689,663 B2
(45) Date of Patent: Mar. 30, 2010

(54) EMBEDDED WEB-BASED MANAGEMENT METHOD

(75) Inventors: Keith R. Kinnan, Cypress, TX (US); Balaji Natrajan, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 946 days.

(21) Appl. No.: 11/191,639

(22) Filed: Jul. 28, 2005

(65) Prior Publication Data

US 2006/0218305 A1    Sep. 28, 2006

Related U.S. Application Data

(60) Provisional application No. 60/664,816, filed on Mar. 24, 2005.

(51) Int. Cl.
*G06F 15/16* (2006.01)
(52) U.S. Cl. .................... 709/217; 717/170
(58) Field of Classification Search ............ 709/217, 709/219, 223; 717/122, 170, 173; 707/104, 707/511
See application file for complete search history.

(56) References Cited

U.S. PATENT DOCUMENTS

| | | | | |
|---|---|---|---|---|
| 5,806,078 | A * | 9/1998 | Hug et al. | 715/205 |
| 5,991,773 | A * | 11/1999 | Tagawa | 707/203 |
| 6,094,662 | A * | 7/2000 | Hawes | 707/104.1 |
| 7,305,669 | B2 * | 12/2007 | Roush | 717/170 |
| 2002/0198956 | A1 * | 12/2002 | Dunshea et al. | 709/214 |
| 2005/0144616 | A1 * | 6/2005 | Hammond et al. | 717/173 |

FOREIGN PATENT DOCUMENTS

EP    1161047 B1    12/2001

OTHER PUBLICATIONS

J. Simonson, D. Berleant, X. Zhang, M. Xie, H. Vo Version augmented URIs for reference permanence via an Apache module design Computer Networks and ISDN Systems, vol. 30, Issue 1-7, Apr. 1998, pp. 337-345.*

L. Leon, "Solving Client Resources Caching Problem," the Microsoft Journal for Developers, Jun. 12, 2004, 6 pp. [Online] http://dotnetjunkies.com/WebLog/leon/articles/16315.aspx.

Simonson, J et al., "Version Augmented URIs for Reference Permanence via an Apache Module Design", Computer Networks and ISDN Systems, North Holland Publishing. Amsterdam , IL, vol. 30, No. 1-7, Apr. 1998, pp. 337-345, XP004121413 ISSN: 0169-7552.

(Continued)

*Primary Examiner*—Ramy M Osman
*Assistant Examiner*—Marshall McLeod

(57) ABSTRACT

Methods and systems for embedded web-based management are disclosed. In some embodiments, an index web page is provided with a link to an uncacheable version control file, and with a script to cause redirection to a uniform resource locator (URL) having a version indicator determined from the version control file. The version indicator allows web caching of current files while ensuring that the cache be updated when the software on the target device is updated. The target device may have an embedded web server configured to enforce caching policies through expiration dates in HTTP response headers. The embedded web server may also be configured to remove version information from the URLs in requests before servicing the requests.

18 Claims, 3 Drawing Sheets

OTHER PUBLICATIONS

Tay Teng Tiow et al., "Distributed Web Cashing with Incremental Update", Communications Systems, 2002, ICCS 2002.
The 8th International Conference on Nov. 25-28, 2002, Piscataway, NJ, USA, IEEE, vol. 2, Nov. 25, 2002, pp. 1147-1151, XP010629400 ISBN: 0-7803-7510-6.
Zanders, et al., "Dynamics and Cachability of Web Sites: Implications for Invented Capacity Networks", Networks, 2003.
ICON2003, the 11th IEEE Internat'l Conf., 28 Oct. 1, 2003, Piscataway, NJ, USA, IEEE, Sep. 28, 2003, pp. 45-50, XP010683500 ISBN: 0-7803-7788-5.
Amsden, et al., "Goals for Web Versioning", draft-left-webdev-version-goals-01.txt IETF Standard-working-draft, Internet Engineering Task Force, IETF, CH, vol. webday, No. 1, Jun. 26, 1999 XP01502961, ISSN: 0000-0004.

* cited by examiner

FIG. 3

```
<HTML>
  <HEAD>
    <TITLE>Embedded web-based management utility</TITLE>
  </HEAD>
  <BODY>
    <SCRIPT src="ver.nc"></SCRIPT>
    <SCRIPT src="app_ver.js"></SCRIPT>
    <SCRIPT>
    //Redirect to a new URL based on the current version if
    //necessary to prevent browser caching from messing up
    //application upgrades.
    var version = new CVersion();
    if (!version.RedirectToVersionURL())
    {
      //display content
      document.write("This is an example of a web-based management utility");
      . . .
    };
    </SCRIPT>
    <-- Additional HTML content may be placed here -->
    <A href="config.htm">Click here to configure the device</A>
    ...
  </BODY>
</HTML>
```

- 302 (page)
- 304: `<SCRIPT src="ver.nc"></SCRIPT>`
- 306: `<SCRIPT src="app_ver.js"></SCRIPT>`
- 308: script block
- 310: `var version = new CVersion();`
- 312: `if (!version.RedirectToVersionURL())` and `<A href="config.htm">`

FIG. 4

```
MAJOR_VERSION=2;
MINOR_VERSION=1;
BUILD_NUMBER=15;
```
402

FIG. 5

```
1   //CVersion - Class to get the application version
2   //public method:
3   //  RedirectToVersionURL() - redirects application to a URL based on current version
4   //     if already not using a current version URL. Returns true if the redirect will occur.
5   function CVersion() {
6     this.RedirectToVersionURL = function() {
7       var isRedirect = false;
8       var urlString = "" + document.location;
9       //Test to see if there is a version marker in the URL
10      var newUrl = "";
11      var versionRegExp = new RegExp("/v[0-9][0-9][0-9][0-9][0-9][0-9][0-9][0-9]/");
12      var ar = versionRegExp.exec(urlString);
13      if (ar != null) {
14        //There is a version marker in the URL.Test to see if the version marker
15        //matches current version. If it does, do nothing - the URL is fine. If it does
16        //not match, then replace it with the current version
17        var thisVersionRegExp = new RegExp("/" + versionUrlEncoding() + "/");
18        if (!thisVersionRegExp.test(urlString)) {
19          //The new URL will have the /v########/ in it with the current version
20          var urlStart = urlString.substr(0,ar.index + 1);
21          var urlEnd = urlString.substr(ar.index + 10);
22          if (urlEnd.charAt(0) != "/") { urlEnd = "/" + urlEnd; }
23          newUrl = urlStart + versionUrlEncoding() + urlEnd;
24          isRedirect=true;
25        }
26      }
27      else {
28        //There is no version marker in the URL. Put one in there.
29        //The new URL will have the /v########/ in it with the current version
30        var lastSlashIndex = urlString.lastIndexOf("/");
31        var urlStart = urlString.substr(0,lastSlashIndex + 1);
32        var urlEnd = urlString.substr(lastSlashIndex);
33        if (urlEnd.charAt(0) != "/") { urlEnd = "/" + urlEnd; }
34        newUrl = urlStart + versionUrlEncoding() + urlEnd;
35        isRedirect = true;
36      }
37      if (isRedirect) { document.location = newUrl; }
38      return isRedirect;
39    }
40    function versionUrlEncoding() { ... }
41  }
```

EMBEDDED WEB-BASED MANAGEMENT METHOD

CROSS-REFERENCE TO A RELATED APPLICATION

The present application claims the benefit of, and incorporates by reference, provisional application Ser. No. 60/664,816, filed Mar. 24, 2005, and entitled "Method Of Improving Performance Of A Web-Browser-Based, Target Based Management GUI With Support For Version Upgrades."

BACKGROUND

The Internet confers many benefits due to its connectivity. Users are able to access public content from any web-enabled computer. People throughout the world are able to interact one-on-one and in groups. Businesses are able to market their goods for minimal costs. Employees are able to tap into their employers' networks to work outside the office. These benefits are just some examples of why the Internet has been almost universally embraced.

As the Internet continues to expand, new applications are being discovered. Storage area networks are being equipped with switches and storage controllers that have embedded web-based management utilities. Such devices ("target" devices) are accessible using Internet Protocol (IP) communications, allowing a user to configure and review the operation of the target devices via a conventional web browser. Proposals have even been made to connect home control systems and even home appliances to the Internet using such embedded web-based management utilities.

Constraints for such devices are expected to include memory and processor power. Processors built in to target devices are expected to be inexpensive (i.e., to have limited processing power) and to have most of their processing power devoted to coordinating device operation. Memory is also expected to be limited. Visually complex web-based interfaces generally manifest themselves as large files and/or a large number of files that need to be transferred by the utility to the user's web browser. Due to the limited resources available to the utility, such transfers may take an unreasonable amount of time to complete, testing the user's patience if many such transfers are needed.

Conventional web browsers offer caching of web pages, so that repeated downloads of a given file may be avoided. When caching is enabled, a web browser downloads a given file once and stores it in a cache, giving the cached file an expiration date. Subsequent accesses to the file, so long as they occur before the expiration date, are satisfied by retrieving the file from cache rather than downloading the file again.

However, caching creates a potential problem when, e.g., a web-based management utility is updated. Depending on the caching policy employed, the utility may continue to use out-of-date files, rendering the update ineffective, or may fail to operate properly because the browser employs a mix of old and new files. Various solutions to this dilemma exist that involve a tradeoff in performance vs. update risk.

BRIEF DESCRIPTION OF THE DRAWINGS

For a detailed description of illustrative invention embodiments, reference will now be made to the accompanying drawings in which:

FIG. 3 shows an illustrative web page to implement the method of FIG. 2;

FIG. 4 shows an illustrative version control file; and

FIG. 5 shows an illustrative redirection script.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various invention embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be illustrative of that embodiment, and not intended to suggest that the scope of the disclosure, including the claims, is limited to that embodiment.

Figure 1:
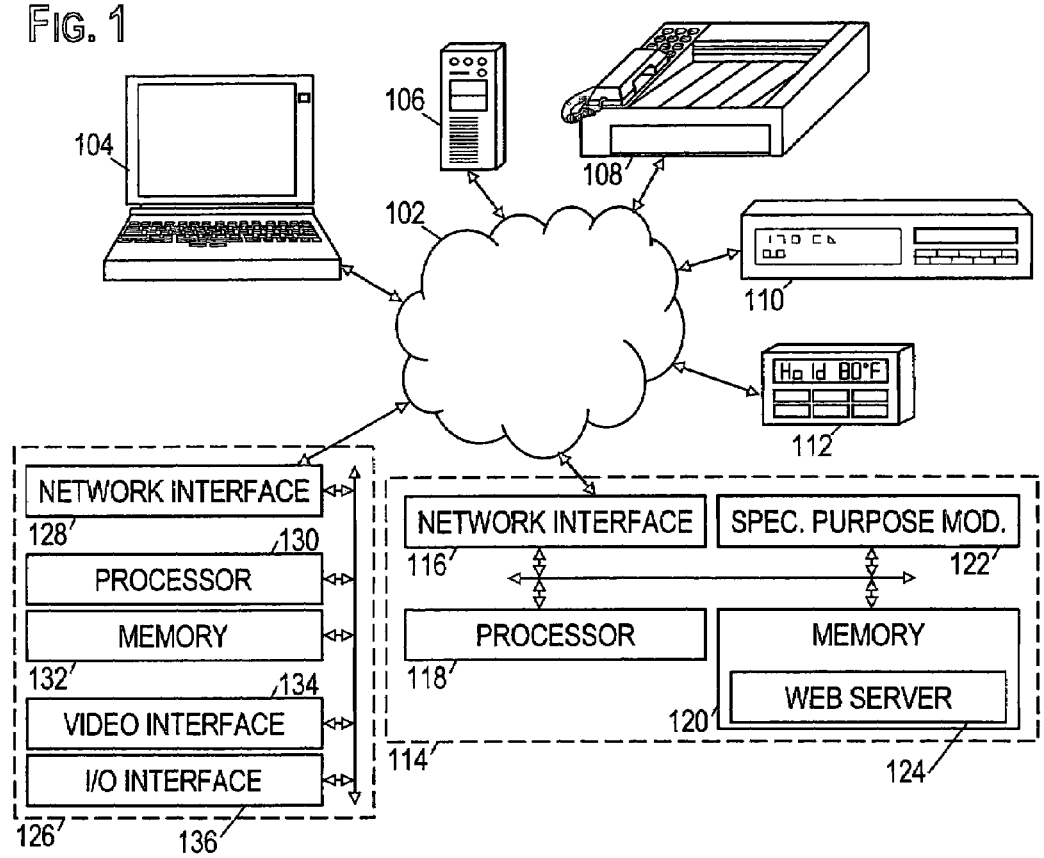
FIG. 1 shows a user device coupled to a target device via a network that supports internet protocol (IP) communications.

FIG. 1 shows an illustrative network environment in which a network 102 interconnects a computer 104, a network storage array 106, network-enabled consumer electronics 108, 110, a network-enabled thermostat 112, a target device 114 shown in block-diagram form, and a user device 126 shown in block-diagram form. Computer 104 and device 126 are illustrative of user devices, i.e., devices having a web browser that provides a graphical user interface (GUI) that a user may employ to access files on other network-enabled devices. Other examples of user devices include personal digital assistants (PDAs), mobile phones, and video game consoles.

Devices 106-114 are illustrative of target devices, i.e., devices that include an embedded web server that allows user devices to access files or other locally available data. Target devices may take the form of network switches, network storage devices, network-enabled appliances, etc. Target device 114 includes a network interface 116, a processor 118, memory 120, and a special purpose module 122. Network interface 116 couples to network 102. Processor 118 executes web server software 124 in memory 120 to receive hypertext transfer protocol (HTTP) requests via interface 116 and to send HTTP responses via interface 116. The processor 118 may be further configured to control the operation of special purpose module 122 which carries out the particular design function of the target device, e.g., information storage, printing, audio-video playback, temperature control, etc.

User device 126 includes a network interface 128, a processor 130, a memory 132, a video interface 134, and an I/O interface 136. Network interface 128 couples to the network 102. Processor 130 executes web browser software in memory 132 to send HTTP requests and receive HTTP responses via interface 128. The web browser software configures processor 130 to generate a visual display via video interface 134 and to operate on user input received via I/O interface 136. The web browser software provides a standardized platform that is employed by the web server software 124 to create a GUI for managing target device 114. Via the GUI the user may, for example, view and change configuration parameters that affect the target device's operation and/or the user may simply monitor the device's performance.

Depending on the design budget and available hardware resources, an embedded web server's responses to requests may be slow. A web browser GUI may require many requests to the embedded web server, making the overall interface appear slow. For example, an embedded web-based management utility for storage system configuration and management may use several hyper-text mark-up language (HTML) files, JavaScript files, and image files to create an interactive and visually dynamic GUI that runs in a web browser on a user device. The GUI may employ a graphical tree that can have thousands of storage devices, with a user-friendly image for each device. Each image resides in a separate image file that must be retrieved using an HTTP request to the web server. The many HTTP requests slow the browser's operation, burden the target device with additional processing resource demands, and make the embedded web server a bottleneck, unless caching is enabled. The methods disclosed herein leverage the caching abilities of the web browser to improve performance while ensuring that upgrades to the target device are properly run without any requirement for manual user intervention.

The user may be able to greatly speed up the GUI by turning on caching in the browser and preventing the browser for checking for newer file versions on each request. However, such actions mean that if the target device's firmware or software is upgraded, the user will be using obsolete file versions in the browser cache. In this situation, the device software upgrade is carried out in an inconsistent manner. If the user does not clear the browser cache after upgrading, the GUI application may not run properly and may even crash because potentially old and out of date application files are being used.

Figure 2:
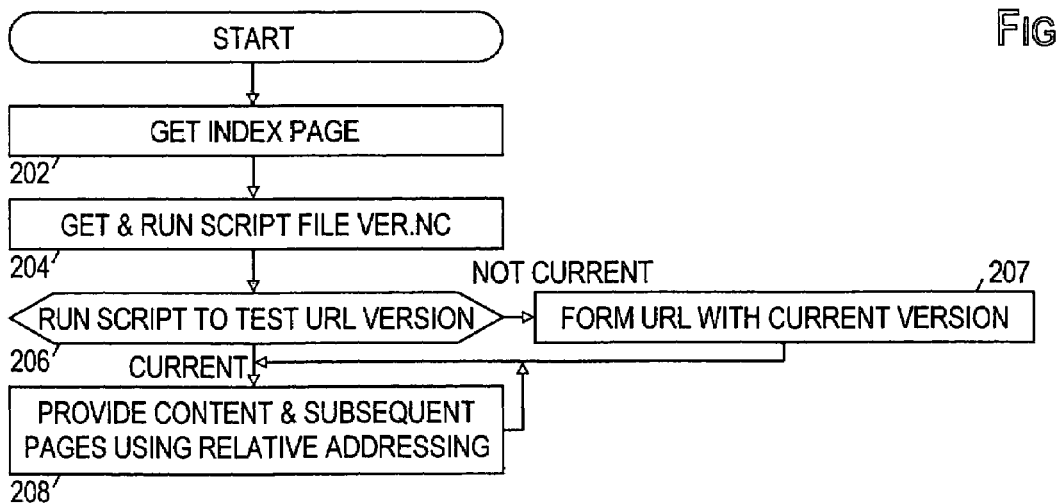
FIG. 2 shows a flowchart of an illustrative embedded web-based management method.

FIG. 2 shows a flowchart of an illustrative embedded web-based management method that leverages the performance gains offered by browser caching without the foregoing disadvantages. A user types in a uniform resource locator (URL) or network address for the target device in an address field of a web browser. In block 202 the web browser requests an index file from the target device. The index file may take the form of a cacheable hypertext markup language (HTML) page. In responding to this request and other requests for files deemed to be cacheable, the embedded web server may provide a response header with a future expiration date, e.g., 3 months, 6 months, or a year from the present, or "infinity." The web browser will examine the expiration in making a decision as to whether or not to cache the file.

The index page includes a link to a version control file. In some embodiments, the version control file link may be embedded in a script (i.e., a set of instructions for execution by the browser) so that the version control file is received and its contents are treated as executable instructions. Thus, in block 204, the browser requests the version control file from the target device and executes the instructions contained in the file when the file is received. The instructions may store version information in one or more variables for subsequent use. The version control file is meant to be non-cacheable. In responding to this request and other requests for files deemed to be non-cacheable, the embedded web server may provide a response header with a current or past expiration date. The web browser should decline to cache file from such "expired" responses.

The index page further includes a script that, in block 206, causes the browser to test that the URL of the index page contains a version indicator that matches information in the version control file. If the version indicator is missing or not current, in block 207 the script causes the browser to issue a request with a URL that has a current version indicator, thereby "redirecting" the browser to the file specified by the new URL. (As will be explained in further detail below, the file specified by the new URL may be the same image page.) If the version indicator is correct, in block 208 the script causes the browser to display the content of the index page. The index page may employ relative links that preserve the version indicator in any URLs used to request the pages or files accessible via the index page.

The embedded web server may be configured to ignore the version indicator. That is, in responding to a request having a URL with a version indicator, the embedded web server may remove the version indicator from the URL to determine a version-free URL. The embedded web server may then provide in response to the request a file identified by the version-free URL. In embodiments employing this option, the embedded web server possesses the version information only in the version control file. The scripts do all of the work associated with version control to make sure the user does not inadvertently use obsolete files from the browser cache.

The caching policy (i.e., the determination of which files are not cacheable and therefore are to be provided with HTTP response headers indicating an imminent or past expiration date) may be based on a file naming convention. For example, files such as the version control file that are deemed non-cacheable may be given a file name with a ".nc" extension (e.g., "version.nc"). All other files may be deemed cacheable by default, and given a future expiration date, e.g., 1 year in the future. To maximize performance, files would be cacheable by default, with only a minimum number of small files for all dynamic content (i.e., device status and device data), which would be accessible as special files with the ".nc" extension, e.g., "data.nc." When the target device's software or firmware is upgraded, the version control file is updated to hold a new version number. The browser will request the version control file and use an updated version indicator as part of the current and future URL requests. The web browser will look in its cache for these requests and will not find any of these URLs, forcing the browser to send requests to the embedded web server. As the requests are satisfied, the updated (cacheable) files will be saved in the browser cache. Consequently, the GUI application will be upgraded properly and no old cached files will be used.

FIG. 3 shows an illustrative entry level page 302. When a user specifies a device address with no specific file, the targeted web server provides a default page such as "index.htm", so index.htm (the "index page") is a good example of an entry level page. Entry level page 302 is shown as HTML code that may appear in a file named "index.htm." In accordance with the HTML standard, HTML tags are used to delineate components of the page. Each page component appears between a pair of tags, e.g., <HTML> and </HTML>; <HEAD> and </HEAD>; <SCRIPT> and </SCRIPT>. Every HTML page may consist of a head portion and a body portion. The head portion commonly includes metadata about the page, while the body commonly includes the content. In the present example, the head potion includes a title element, identifying a title for the web page.

In the body of the illustrative page 302, three scripts appear. A first script 304 includes a link to a version control file "ver.nc," which causes the version control file to be retrieved and executed by the browser. FIG. 4 shows an illustrative version control file 402 containing three script commands to store version information in three variables, MAJOR_VERSION, MINOR_VERSION, and BUILD_NUMBER. After the script file has been executed, the version information is available in these three variables for use by subsequent script commands.

With reference to FIG. 3, a second script 306 includes a link to a file "app_ver.js" containing a class with functions to enforce the use of a version indicator in the URL. FIG. 5 shows illustrative file 502 containing script commands that create a "CVersion" class (lines 5-41). The class includes a redirection function "RedirectToVersionURL" (lines 6-39) that determines the URL of the current page (line 8), tests the URL to determine if it includes a version indicator (lines 11-13), determines whether the version indicator is correct (lines 17-18), constructs a URL with the correct version indicator if none existed (lines 28-35) or it was incorrect (lines 19-24), and in either case redirects the browser to a URL with the correct version indicator (line 37). A supplemental function "versionUrlEncoding" (line 40) has been omitted, but it simply converts the version information into a fixed-length version indicator.

With reference again to FIG. 3, the second script 306 defines a class. The third script 308 creates a class object "version" in statement 310. In statement 312, the third script 308 invokes the redirection function described previously. If the redirection function returns an indication that redirection is unneeded (i.e., an indication that the current page is not obsolete), the script 308 may display the page content in the browser. Alternatively, the page content may be placed after the scripts. In any event, the page content may include links 312 to other files on the target device. Such links 312 are provided in relative form "config.htm" rather than absolute form "http://1.2.3.4:80/config.htm" to ensure that only up-to-date versions of cached files are accessible to the user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A web-based management method comprising: providing a web page that includes: a link to a version control file; and a script to cause redirection to a uniform resource locator (URL) having a version indicator determined from the version control file if the URL of the provided page does not include a version indicator that matches version information in the version control file; and providing the version control file with a response header that prevents caching of the version control file.

2. The method of claim 1, further comprising:
receiving a request with a URL having a version indicator;
determining a version-free URL having said version indicator deleted; and
providing a file identified by the version-free URL.

3. The method of claim 2, wherein the file identified by the version-free URL is said web page.

4. The method of claim 1, wherein said web page includes links using relative addressing to incorporate the version indicator in the URL of corresponding requests to an embedded web server.

5. The method of claim 1, wherein said web page is provided with a response header that allows caching of the web page.

6. The method of claim 1, wherein said web page is provided with a response header indicating an expiration date that is at least a year away.

7. The method of claim 1, wherein the version control file has a name to indicate that the version control file should not be cached.

8. The method of claim 1, further comprising:
receiving a request with a URL having a caching indicator;
providing a file identified by the URL with a response header indicating an expiration date in the past if the caching indicator indicates that the file should not be cached; and
providing the file identified by the URL with a response header indicating an expiration date in the future if the caching indicator indicates that the file should be cached.

9. A device that comprises: a network interface configured to couple the device to a network having a computer with a web browser; a memory configured to store web server software; and a processor coupled to the memory to execute the web server software, wherein the web server software configures the processor to: receive a request for an entry level web page via the network interface; and respond to said request with a cacheable web page that includes: a link to a version control file; a script that redirects to a URL having a version identifier determined from the version control file if the URL of the cacheable web page does not include a version identifier that matches information in the version control file; and provide the version control file with a response header that prevents caching of the version control file.

10. The device of claim 9, wherein the web server software further configures the processor to:
determine a version-free URL for each request having a URL with a version identifier; and
respond to each said request with a file identified by the version-free URL.

11. The device of claim 9, wherein the web server software further configures the processor to:
determine a cacheability status for each file request received via the network interface;
respond to each said request having a cacheable status with a response having a response header indicating an expiration date at least six months in the future; and
respond to each said request having a non-cacheable status with a response having a response header indicating an expiration date in the past.

12. The device of claim 9, wherein the redirection URL causes the web browser to request and cache the entry level web page under a new URL.

13. The device of claim 12, wherein the entry level web page uses relative links, and wherein the web browser caches cacheable files accessed via the entry level web page under corresponding URL addresses that include a current version identifier.

14. A web-based management system that comprises: a target device having an embedded web server configured to determine an unversioned URL from each HTTP request before servicing the request and the target device configured to provide a version control file with a response header that prevents caching of the version control file; a user device having a web browser that requests an index page from the target device, wherein the index page includes a link to the version control file; and a script to cause any files accessed via the index page to be requested with a URL having a version marker determined from information in the version control file.

15. The system of claim 14, wherein files accessed via the index page follow a naming convention to indicate whether or not the files are cacheable.

16. The system of claim 15, wherein the web server is configured to respond to each request for a cacheable file with a response header indicating an expiration date at least three months in the future, and is further configured to respond to each request for an uncacheable file with a response header indicating a past expiration.

17. The system of claim 14, wherein the script further causes the index page to be requested with a URL having a current version marker unless the index page already has a URL with a current version marker.

18. The system of claim 17, wherein the index page and any subordinate links to files on the target device employ relative links, and wherein the user device caches all cacheable files accessed via the index page under corresponding URL addresses that include a current version marker.

* * * * *